No. 824,382. PATENTED JUNE 26, 1906.
O. E. QUITMAN, Jr.
COMBINED BOLT AND NUT LOCK.
APPLICATION FILED JAN. 25, 1906.

WITNESSES:
Geo. D. Richards
Frederick Jamison

INVENTOR:
Otto E. Quitman Jr.,
BY
Fred K. Fraentzel,
ATTORNEY

UNITED STATES PATENT OFFICE.

OTTO E. QUITMAN, JR., OF NEWARK, NEW JERSEY.

COMBINED BOLT AND NUT-LOCK.

No. 824,382.  Specification of Letters Patent.  Patented June 26, 1906.

Application filed January 25, 1906. Serial No. 297,726.

*To all whom it may concern:*

Be it known that I, OTTO E. QUITMAN, Jr., a citizen of the United States, residing at Newark, in the county of Essex and State of New Jersey, have invented certain new and useful Improvements in a Combined Bolt and Nut-Lock; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention has reference generally to improvements in bolts for various uses; and the invention relates more particularly to a novel bolt and nut-lock which is especially adapted for use with the oscillating blades of shears, scissors, and the like, but which may also be used for the purposes of connecting any other two parts or members of any suitable construction, such as are used in machinery and railway construction.

The invention has for its principal object to provide a simple device of the general construction and character hereinafter more fully set forth which permits of the nut to be readily screwed upon the screw-threaded end of the bolt, but prevents the accidental displacement and loosening of the nut upon the screw portion of the bolt when the latter is used as a pivotal pin for connecting two or more oscillating members or when subjected to jarring, as in the case of connecting the parts of a piece of machinery or the fish-plates to railway-rails, and which is adapted for use also on the axles of vehicles of the various kinds.

With the objects of my present invention in view the said invention consists, primarily, in the novel bolt and nut-lock hereinafter set forth.

The invention is clearly illustrated in the accompanying drawings, in which—

Figure 1:
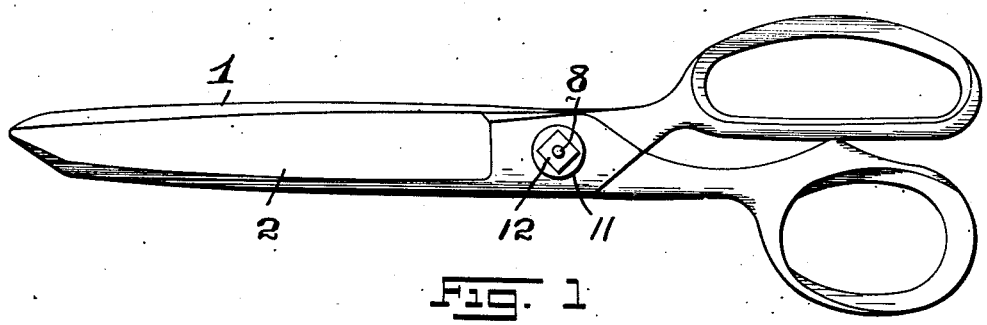
Figure 2:
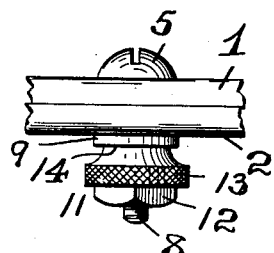
Figure 3:
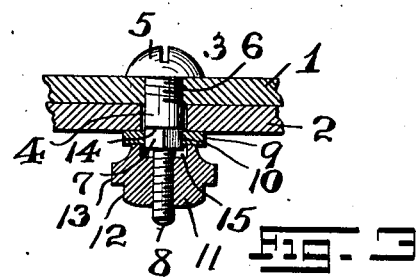
Figure 4:
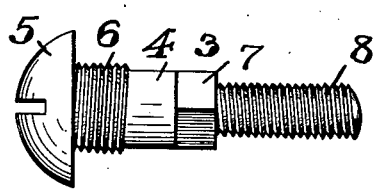
Figure 5:
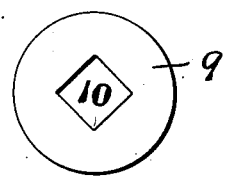

Figure 1 is a face view of a pair of shears or scissors having the two oscillating blades thereof pivotally connected by means of a bolt and nut-lock embodying the principles of the present invention. Fig. 2 is a top edge view of the central portions of the two shear-blades and an elevation of the bolt and nut, showing the parts in their operative relation upon the opposite faces of the blades; and Fig. 3 is a transverse sectional representation of the said parts with the bolt shown in elevation. Fig. 4 is an elevation of the bolt on an enlarged scale, and Fig. 5 is a face view of a washer or disk employed with the bolt when the parts are in their relative positions illustrated in said Figs. 1, 2, and 3.

Similar characters of reference are employed in the above-described views to indicate corresponding parts.

Referring now to the said drawings, the reference characters 1 and 2 indicate a pair of scissor or shear blades, which are shown to illustrate one use of the bolt and nut-lock embodying the principles of my present invention.

The reference character 3 indicates the bolt, of which 4 is the main body or shank and 5 is a suitable head, the said body or shank 4 when the bolt and nut lock is used with the shear-blades being preferably provided with a screw-threaded portion 6, but which may be dispensed with in some cases. The said main body or shank is also provided with an angular or polygonally shaped part or member 7, usually of a four-sided or square configuration.

Extending from the face of the part or member 7 is a screw-threaded shank 8, the cross area of which is less than that of the said angular part or member 7, substantially as shown in Figs. 3 and 4 of the drawings. When the bolt has been inserted in the registering holes of the two blades 1 and 2 in the manner shown in said Fig. 3 or in the two or more registering holes of a piece of machinery or the like, the said angular part or member 7 will extend beyond the face of the one blade, as 2, so as to be capable of receiving thereon a washer or disk 9, having an angularly-shaped opening or hole 10 of the marginal configuration which corresponds to the angular form or shape of the said part or member 7. Upon the said screw-shank 8 is screwed a nut 11 of any suitable configuration, that herein shown being provided with a nut-shaped part 12 for the reception of a wrench and with a knurled part 13 for turning the nut by hand; but these parts are not essential, and either one may be dispensed with, according to the use to which the device is to be put. The nut 11 has its part 14 resting directly upon the face of the said washer or disk 9, as shown, and said nut is also preferably provided with a chambered portion 15, the purposes of which will be clearly understood from an inspection of the figures of the drawings.

From an inspection of the several figures of the drawings it will be evident that when the nut 11 is tightly screwed home no amount of turning or shaking or jarring of the bolt body or shank in the bolt-holes of the connected parts will unloosen the nut 11, because the washer 9, being arranged upon the annular part or member 7 of the bolt, will turn with the same, and the friction that is ordinarily brought upon the face of the nut is taken up by the said disk, which is locked, and the said washer or disk being thus held against turning independently upon the bolt it prevents any independent turning and consequent loosening of the nut 11 upon the screw-threaded portion or shank 8 of the bolt proper, as will be clearly evident.

My novel bolt and nut-lock is admirably adapted for use with the pivoted and oscillating blades of shears, scissors, and the like; but the invention may be used also for connecting any two parts of a machine or upon an axle of a vehicle or for securing a fish-plate to the abutting end portions of railway-rails, beams, and the like.

I claim—

In a combined bolt and nut-lock, a bolt comprising a main shank having a screw portion, a head, an angular member forming a part of said main shank, a second shank extending from said angular member, said second shank being provided with a screw portion, the arrangement of the screw-threads upon said screw portions being respectively left and right handed, a washer or disk provided with an angularly-formed opening arranged upon said angular member, and a nut upon the screw portion of said second shank adapted to be screwed against said washer or disk, said nut being formed with a chamber, and having an outer nut-shaped part for a wrench, and a knurled member which serves as a finger-piece, substantially as and for the purposes set forth.

In testimony that I claim the invention set forth above I have hereunto set my hand this 15th day of January, 1906.

OTTO E. QUITMAN, JR.

Witnesses:
PAUL W. RODER.
PAUL G. RODER.